(No Model.)

D. SPENCER.
ROD OR VALVE PACKING BOX.

No. 521,575. Patented June 19, 1894.

Witnesses

Inventor
David Spencer,
By his Attorneys.

THE NATIONAL LITHOGRAPHING COMPANY,
WASHINGTON, D. C.

UNITED STATES PATENT OFFICE.

DAVID SPENCER, OF SHENANDOAH, VIRGINIA.

ROD OR VALVE PACKING BOX.

SPECIFICATION forming part of Letters Patent No. 521,575, dated June 19, 1894.

Application filed July 22, 1893. Serial No. 481,221. (No model.)

*To all whom it may concern:*

Be it known that I, DAVID SPENCER, a subject of the Queen of Great Britain, residing at Shenandoah, in the county of Page and State of Virginia, have invented a new and useful Rod or Valve Packing Box, of which the following is a specification.

My invention relates to an improvement in stuffing boxes for piston-rod valve-stem and other packing boxes, and it has for its object to provide a simple and effective combination of parts provided with means for adjustment to take up lost motion caused by wear.

Further objects and advantages of this invention will appear in the following description, and the novel features thereof will be particularly pointed out in the appended claims.

Figure 1:
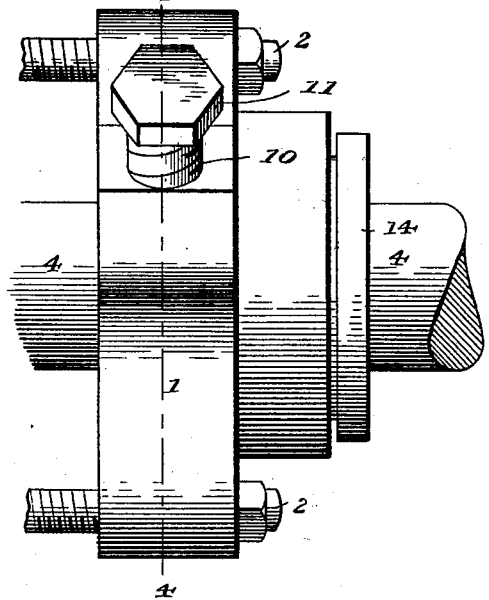
Figure 2:
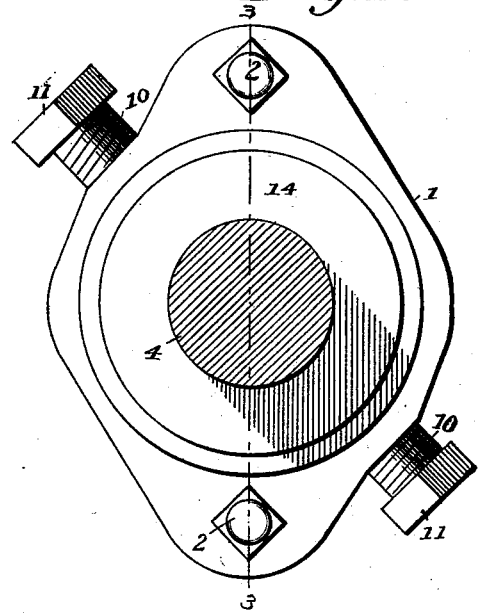
Figure 3:
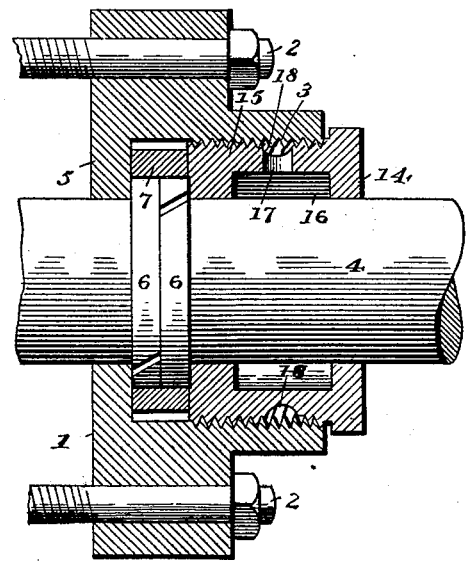
Figure 4:
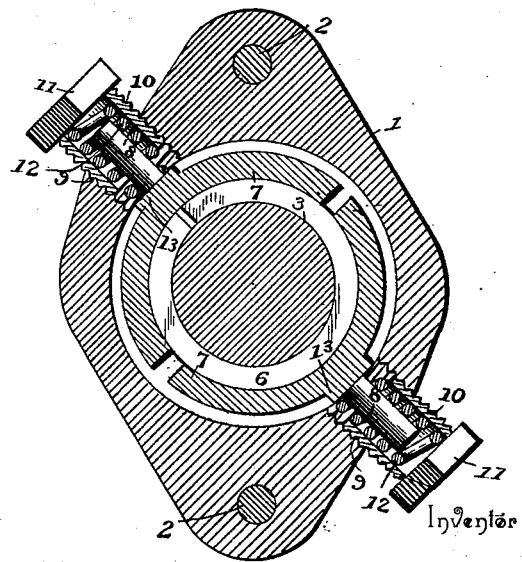

In the drawings: Figure 1 is a side view of a stuffing box embodying my invention. Fig. 2 is a front view of the same. Fig. 3 is a vertical section on the line 3—3 of Fig. 2. Fig. 4 is a sectional view upon the line 4—4 of Fig. 1.

Similar numerals of reference indicate corresponding parts in all the figures of the drawings.

1 designates a gland or casing provided with the usual securing bolts 2, and having a central bore 3 for the reception of the piston rod or shaft 4, said bore being enlarged to form a shoulder 5.

6, 6, represent packing rings, which are fitted in the enlargement of the bore of the gland or casing close to the shoulder 5, and they are split on an incline whereby their overlapping terminals are beveled, as clearly shown in Fig. 3. Around the packing rings is arranged a clamping device comprising the approximately semicircular jaws 7, provided with radially-disposed stems 8, which extend into radial perforations 9, which are formed in the walls of the gland or casing. Said perforations are threaded to receive the exteriorly-threaded guide-tubes 10, provided with heads 11, and inclosing the tension springs 12. The outer ends of the tension springs bear against the heads 11, and their inner ends against shoulders 13, at the junction of the stems 8 with the yokes 7. The guide-tubes are adjustable to vary the tension of the springs, and hence the clamping action upon the packing rings.

14 represents a spanner bushing, which is threaded into the outer end of the bore of the gland or casing and bears at its inner end upon the jaws 7 and packing rings 6, being provided at its inner end with an inwardly-extending rim or flange 15 to bear upon the packing rings. The bore formed by the inner edge of the rim or flange 15 is equal to the inner portion of the bore of the gland, and hence fits the piston-rod snugly, and the enlarged portion of the bore of the bushing forms an oil chamber 16, which communicates, by means of radially-disposed oil ducts 17, with the annular surface channel 18, which is fed with oil by means of an ordinary oil cup (not shown) said perforations and channel being closed and covered by the walls of the gland or casing when the bushing is in place.

It will be seen that the annular bushing 14 maintains the packing rings and clamping devices firmly in position and at the same time provides a means for gaining access thereto for purposes of cleaning, repairing, &c.

Various changes in the form, proportion and the minor details of construction may be resorted to without departing from the principle or sacrificing any of the advantages of this invention.

Having described the invention, what I claim is—

1. The combination with a gland or casing, of compressible packing rings, curved jaws engaging opposite sides of the packing rings, adjustable guide-tubes passed from the outside through threaded perforations in the walls of the gland or casing and accessible from the outside thereof, and tension springs coiled within said guide-tubes and bearing at their inner ends against the jaws, substantially as specified.

2. The combination with a gland or casing, of compressible packing rings, approximately semicircular jaws arranged in contact with the outer surfaces of said rings and provided with radially-disposed stems, adjustable guide-tubes threaded in perforations in the walls of the gland or casing, and tension springs arranged within the guide-tubes and embracing said stems, substantially as specified.

3. The combination with a gland or casing, of packing rings arranged therein, a clamping device arranged in operative relation with said rings, and an annular bushing threaded into the outer end of the bore of the gland or casing and provided with an inwardly-extending rim or flange to engage said clamping device and packing rings, and having an inner oil chamber communicating by radial perforations with an exterior oil channel, substantially as specified.

In testimony that I claim the foregoing as my own I have hereto affixed my signature in the presence of two witnesses.

DAVID SPENCER.

Witnesses:
H. E. GEMMELL,
W. W. KELLEY.